United States Patent
Kelkar et al.

(10) Patent No.: US 6,182,128 B1
(45) Date of Patent: Jan. 30, 2001

(54) REAL-TIME MUSIC DISTRIBUTION SYSTEMS

(75) Inventors: Anand Kelkar, Calabasas; Loren C. Johnson, Los Angeles, both of CA (US)

(73) Assignee: Touchmusic Entertainment LLC, Los Angeles, CA (US)

( * ) Notice: Under 35 U.S.C. 154(b), the term of this patent shall be extended for 0 days.

(21) Appl. No.: 09/035,194

(22) Filed: Mar. 5, 1998

(51) Int. Cl.[7] .................. G06F 15/16; H04N 7/173; H04H 1/02

(52) U.S. Cl. ................ 709/219; 348/7; 348/12; 455/5.1

(58) Field of Search ................ 348/6, 7, 12, 13; 455/3.1, 4.2, 5.1, 6.1, 6.3; 709/217, 219; H04N 7/16, 7/173

(56) References Cited

U.S. PATENT DOCUMENTS

| | | | |
|---|---|---|---|
| 4,956,768 | 9/1990 | Sidi et al. | 710/53 |
| 5,113,496 | 5/1992 | McCalley et al. | 710/126 |
| 5,191,410 | 3/1993 | McCalley et al. | 348/13 |
| 5,195,092 | 3/1993 | Wilson et al. | 348/13 |
| 5,418,713 | 5/1995 | Allen | 705/32 |
| 5,423,003 | 6/1995 | Berteau | 370/254 |
| 5,550,577 | * 8/1996 | Verbiest et al. | 348/7 |
| 5,555,441 | * 9/1996 | Haddad | 455/4.2 |
| 5,560,038 | 9/1996 | Haddock | 395/200.66 |
| 5,583,763 | 12/1996 | Atcheson et al. | 707/3 |
| 5,590,282 | 12/1996 | Clynes | 395/200.49 |
| 5,619,247 | 4/1997 | Russo | 348/3 |
| 5,636,276 | 6/1997 | Brugger | 380/4 |
| 5,729,281 | * 3/1998 | Utsumi et al. | 348/12 |
| 5,756,280 | * 5/1998 | Soora et al. | 455/4.2 |
| 5,781,889 | * 7/1998 | Martin et al. | 705/1 |
| 5,790,423 | * 7/1998 | Lau et al. | 364/514 |
| 5,867,155 | * 2/1999 | Williams | 345/327 |
| 5,870,553 | * 2/1999 | Shaw et al. | 395/200.49 |

* cited by examiner

Primary Examiner—John W. Miller
(74) Attorney, Agent, or Firm—Oppenheimer Wolff & Donnelly LLP

(57) ABSTRACT

A music distribution system is divided into a plurality of regional networks each including a plurality of users. Each of the regional networks includes a distribution center to which the users of that region are connected. Each distribution center is provided with a library in which is stored a plurality of music titles. A user sends a request to the distribution center via an existing telephone network or cable network. Upon receiving the user's request, the distribution center locates and retrieves the requested data file stored in the regional library, and then transmits the requested file to the user via the existing cable service. At the user's destination, electronic equipment such as a television or a stereo receiver system may provide an audio/visual output of the requested data track.

17 Claims, 3 Drawing Sheets

REAL-TIME MUSIC DISTRIBUTION SYSTEMS

FIELD OF THE INVENTION

The present invention relates to systems connected in a network, such as cable television and telephone systems. More particularly, the present invention relates to systems for distributing information, such as video-on-demand or pay-per-view systems. The invention also relates to methods and apparatus for distributing data files, such as music tracks, over existing telecommunication (e.g., cable, telephone, or satellite) networks to subscribers in response to user requests. The methods and apparatus of the present invention also record information on user requests to marketing purposes.

BACKGROUND OF THE INVENTION

Music is conventionally sold to consumers through either retail outlets or mail order houses. Retail outlets, such as department stores or specialty music stores, sell music directly to consumers on "tangible" media, including compact discs (CDs), magnetic cassette tapes, digital tapes, and vinyl record albums. Mail order houses send catalogs to subscribers who may then order music on the tangible media, which are then mailed to the subscribers through the postal service. A number of costs are involved in the retail sale of music. First of all, the tangible media must be packaged. The packaging typically includes theft-deterrent devices, and warehouses are needed to store the tangible media. Other costs associated with the retail sale of music include inventory control, retail floor space, commercial real estate, merchandise returns, and so on.

One approach at circumventing the conventional retail sale of music is through the Internet. The Internet approach requires the user to have a computer with a powerful processor, an added-on sound card, and a high-speed modem. In order to listen to a desired selection, the user needs to access a web page typically dedicated to a single artist. Because of the limited bandwidth of telephone lines, the user then needs to decide on a tradeoff: real-time listening or high-fidelity listening. If the user wants to listen to the selection in real time, then the computer will play back the selection as a monophonic and heavily filtered 8-bit translation of the original selection. If the user wants to listen to the selection in its original high-fidelity form, then the user needs to download the selection; after the downloading is complete, the user may listen to the selection by playing it back through a home stereo system. A number of disadvantages plague the Internet approach to listening to high-fidelity music in real time: it requires specialized hardware and software; it is inconvenient and complicated; and it is frustratingly slow.

The music industry is highly segmented into a multitude of categories or niches. One only needs to watch a music awards show to see all of the different categories of music. For example, commercial music may be divided into the following categories: classical, popular or "pop" music (often regarded as "Top 40"), country western, rock and roll, heavy metal, jazz, hip hop, rap, urban, adult contemporary, easy listening, new age, punk, soul, funk, Latin, folk, international. Each of these general categories may be further divided into sub-categories. For example, rock and roll is often considered to include heavy metal, punk, alternative, "classic" rock, and even rhythm and blues; classical may include opera, chamber, recital, symphonies, and choral. The classification of music is essentially endless.

One of the advantages of dividing music into categories is that retailers can determine niche markets from the people who buy certain types of music. Typically speaking, heavy metal music is listened to by male teenagers; classical music is listened to by people belonging to an educated, professional, or high-income class; and rap and hip hop are heavily followed by urban youths and young adults. Knowing the demographics of a particular geographic region, retailers may focus on the type of music endemic for the region. In regard to the above example, a retail specialty music store located in an urban setting will carry a wide selection of rap and hip hop but will not carry (or only have a very limited selection) of country western music. Marketing experts have determined that a particular demographic group who listens to a certain type of music typically purchases similar other products en masse. A blatant example of this situation would be that classical music listeners are more likely to purchase a luxury automobile than a pickup truck or compact car and more likely to read *The New Yorker* than *Rolling Stone* magazine than heavy metal listeners.

In view of the foregoing, it is an object of the present invention to provide a distribution system which overcomes the disadvantages and drawbacks associated with conventional approaches of distributing music.

It is another object of the present invention to provide a distribution system which plays back music to subscribers in either real time or at a predetermined time in the future in high-fidelity bandwidth.

It is another object of the invention to provide a music distribution system which records information relevant to consumer behavior based on musical selections to be used for marketing and promotional purposes.

SUMMARY OF THE INVENTION

These and other objects are achieved by the apparatus of the present invention which provides a system for distributing data files. The system is divided into a plurality of regional networks each including a plurality of users. Each of the regional networks includes a distribution center to which the users of that region are connected. Each distribution center includes a library for storing a plurality of data files, such as music tracks.

If a user desires to listen to one or more music tracks stored in the library of a particular region, then the user may send a request to the distribution center via an existing telephone network or cable network. Upon receiving the user's request, the distribution center locates and retrieves the requested data file stored in the regional library, and then transmits the requested file to the user via, for example, the existing cable service. At the user's destination, electronic equipment such as a television and/or a stereo receiver system may provide an audio/visual output of the requested data track.

If the regional library to which a particular user is connected does not have a requested data file, then the distribution center routes the user request to a control center. The control center in turn determines whether the requested data file is located in the libraries in the other regional networks and, if so, retrieves and routes the requested file to the user.

The advantages of the distribution system of present invention are numerous. First of all, existing cable and telephone systems may be utilized, as well as existing home entertainment centers, thereby eliminating the need to install extensive hardware systems. Because of the relatively high bandwidth of existing cable systems, consumers may listen to music in full high fidelity and at real time. Consumers also have immediate access to a large library of music without having to leave their homes, thereby eliminating the need to travel to a retail outlet with a limited selection of music to purchase music, and the need to wait for the arrival of a mail order of music. In addition, record companies benefit as no warehousing facilities are required for storing packaged music awaiting shipping, and as no retail space is required to sell the music.

Other aspects, features, and advantages of the present invention will become apparent to those persons having ordinary skill in the art to which the present invention pertains from the following description taken in conjunction with the accompanying drawings.

DETAILED DESCRIPTION OF EXEMPLARY EMBODIMENTS

Figure 1:
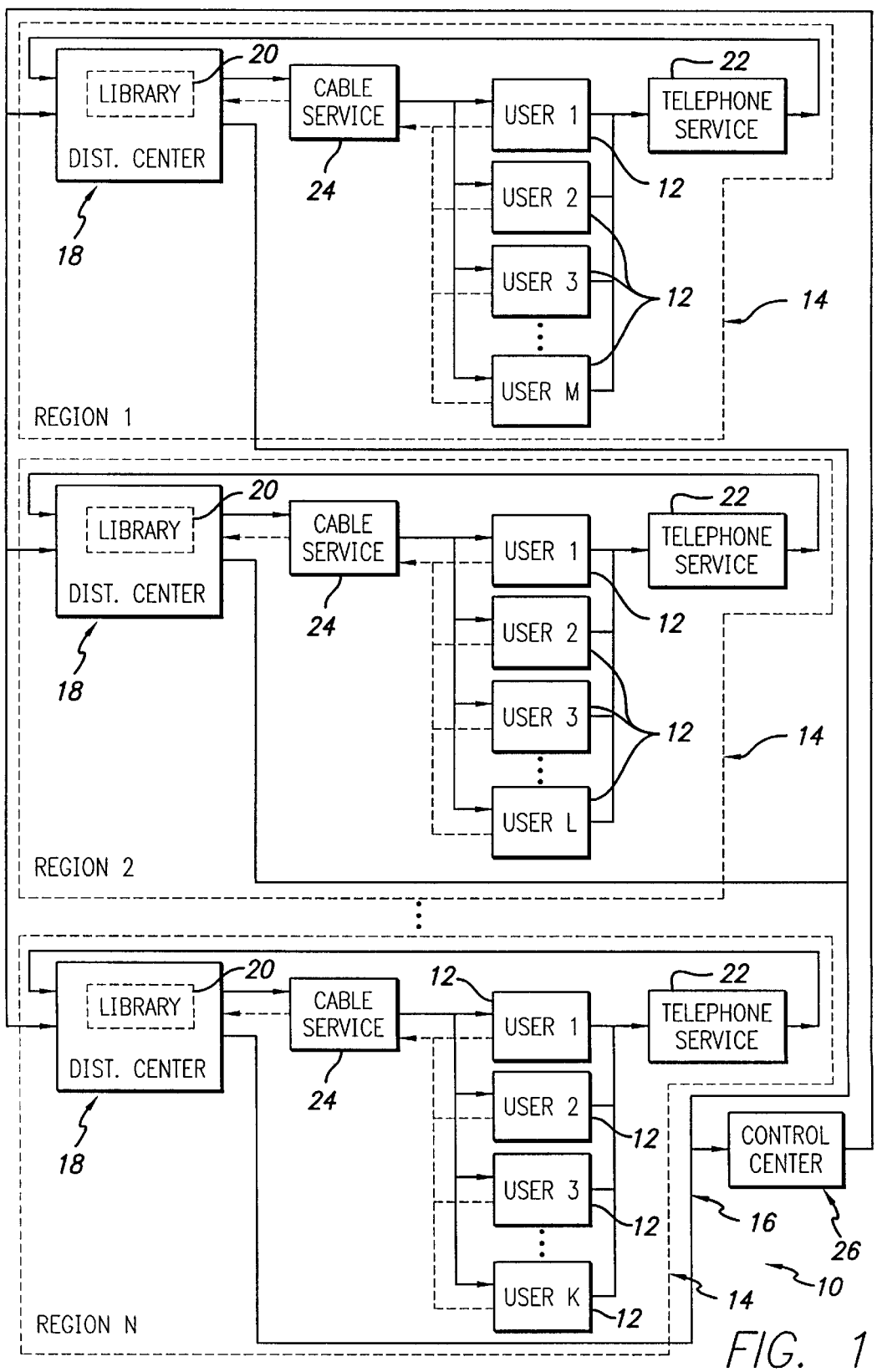
FIG. 1 is a schematic view of a system for distributing data files, such as digitized music tracks, in accordance with an exemplary embodiment of the present invention.

Referring to the drawings, a system 10 for distributing data files in accordance with the present invention is illustrated in FIG. 1. Exemplary system 10 includes a plurality of users 12 connected into a plurality of regional networks 14 by communication media 16. Each of the regional networks 14 includes a distribution center 18 to which the users 12 of that region are connected. Each of the distribution centers 18 includes a library 20 which stores a plurality of data files, such as music tracks.

In accordance a preferred embodiment of the distribution system 10 of the present invention, if a user 12 desires to listen to one or more music tracks stored in the library 20 of a particular region, then the user 12 may send a request to the distribution center 18 via, for example, existing telephone service 22 or cable service 24 (which services may be included as components of the communication media 16). Upon receiving the user's request, the distribution center 18 locates and retrieves the requested data file (i.e., music track) stored in the regional library 20, and then transmits the requested file to the user 12 via, for example, the existing cable service 24. At the user's destination, electronic equipment such as a television or a stereo receiver system may provide an audio/visual output of the requested data track. If the regional library 20 to which a particular user 12 is connected does not have a requested data file, then the distribution center 18 routes the user request to a control center 26. The control center 26 in turn determines whether the requested data file is located in the libraries 20 in the other regional networks 14 and, if so, retrieves and routes the requested file to the user, which will be discussed in more detail below.

Exemplary distribution system 10 of the present invention is particularly useful in marketing goods and services according to regional demographics. In this regard, each of the regional networks 14 may be defined and connected to include users primarily from substantially the same demographic group. For example, Region 1 define a rural agricultural area; Region 2 may define an urban setting, and Region N may define an area inhabited predominantly by a single ethnic minority. If the system 10 is configured to distribute music tracks, then the library 20 in each regional network 14 may store music appealing to the demographic group endemic to the respective region, because this music would be the most commonly requested music. To utilize the regional configuration of the system 10, each of the distribution centers 18 records information relevant to each of the user requests, including information on the particular user and on the requested data file. This recorded information may then be analyzed to determine trends in the requested music selections and, accordingly, to maximize statistically an ideal local regional music library. In addition, the record information may be used for marketing or promotional purposes by retailers.

Figure 2:
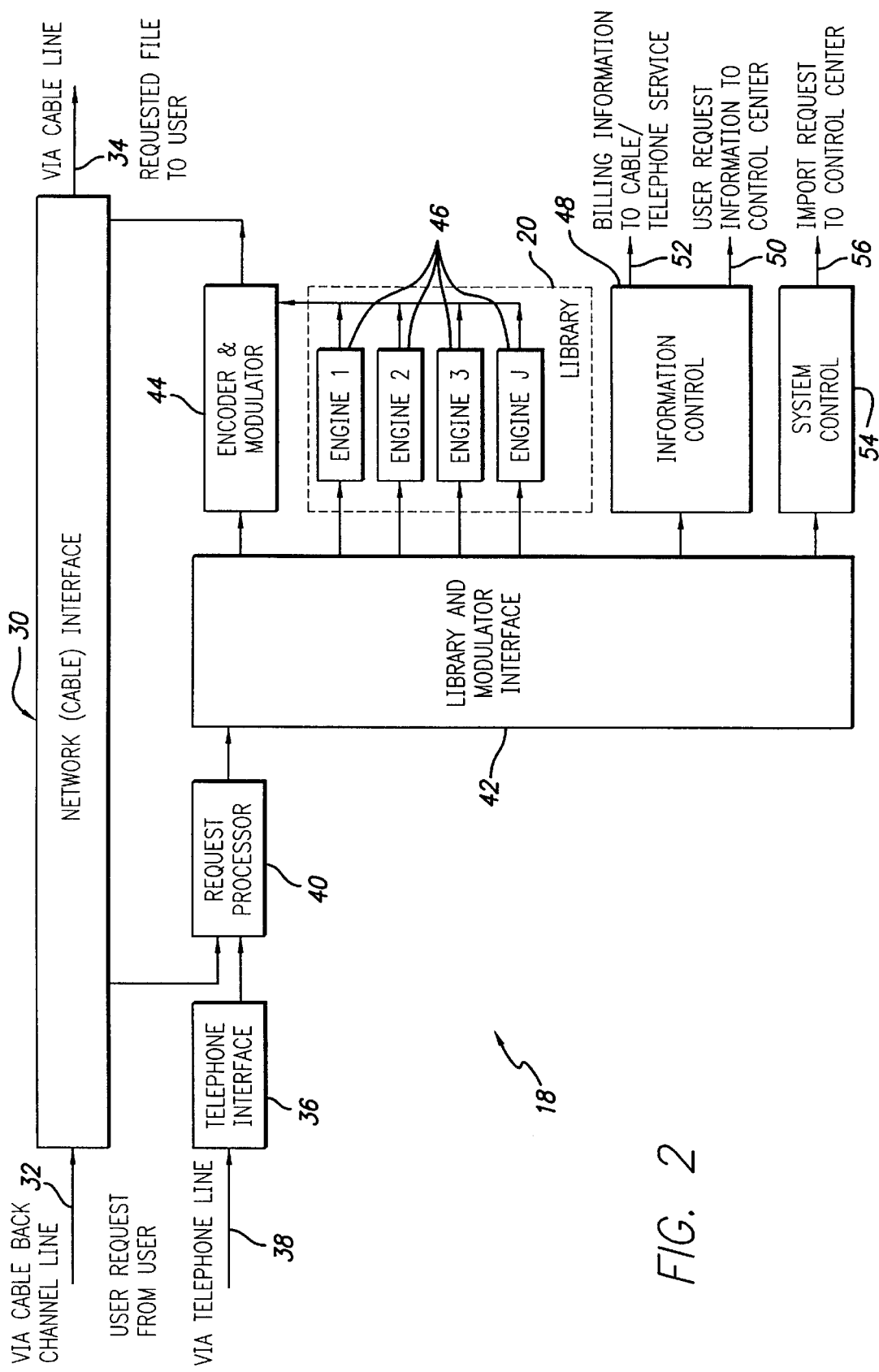
FIG. 2 is a schematic view of an exemplary embodiment of a distribution center of the distribution system of the invention.

An exemplary embodiment of the distribution center 18 is illustrated in FIG. 2. Exemplary distribution center 18 includes a network interface such as a cable interface 30 connected to a network, for example, the existing cable television system 24 shown in FIG. 1, with a plurality of subscribers or users 12. The cable interface 30 includes an input 32 connected to a back-channel line of the cable system 24 for receiving a user request, and an output 34 for transmitting a requested file in response to the user request. Although a cable network is used to illustrate an exemplary embodiment of the distribution system 10, because of the high bandwidth of coaxial cable, other high-bandwidth transmission media may be used, including optical fibers, satellites, microwaves, and so on.

Exemplary distribution center 18 may also include a telephone interface 36 connected to an existing telephone system 22. The telephone interface 36 includes an input 38 for receiving a user request. It is preferable for the distribution center 18 to include both the cable interface 30 and the telephone interface 36 for receiving user requests, because some cable systems do not provide a back-channel line, which is typically a narrow bandwidth built-in channel. If a back-channel line is not available, users may send user requests to the distribution center 18 via existing telephone lines.

Exemplary distribution center 18 includes a request processor 40 which is connected to interfaces 30 and 36 and which processes user requests received by the center 18. The user requests include information regarding the user address, requested data file, and so on. The request processor 40 analyzes this information and provides instructions to a distribution interface or, more specifically, a library and modulator interface 42. The library 20 and an encoder/modulator 44 are connected to an output of interface 42. The library and modulator interface 42 correlates the requested file or files of each user request with data files stored in the library 20.

As illustrated in FIG. 2, exemplary library 20 includes a plurality of engines 46. Each of the engines 46 is connected to the encoder/modulator 44 and includes storage for a plurality of data files and hardware for reading the data files. For example, if exemplary system 10 is configured to distribute music tracks, each engine 46 may include a plurality of compact discs (CDs) (with each track on the CD defined as a data file) and a compact disc player for reading the digitized musical tracks stored on the CDs. Alternatively, each engine 46 may include a disc drive for reading digital data files stored in memory. In a preferred embodiment of the invention, each library 20 includes about 1,000 of the engines 46 each capable of storing about 10 compact discs, each of which in turn may contain approximately 10 music tracks (i.e., data files). Accordingly, each of the distribution centers 18 is capable of providing users with over 100,000 data files from which to choose.

Upon receiving a user request, the request processor 40 determines whether the requested file is located in the library 20. If so, the request processor 40 sends an instruction to interface 42 to retrieve the requested file from the engine 46 at which it is stored, and then to deliver the retrieved requested file to the encoder/modulator 44. The request processor 40 also sends transmission information to the encoder/modulator 44 indicative of the user destination, e.g., the user address. The encoder/modulator 44 modulates and transmits the requested file to the user via the output 34 of the cable interface 30. The requested file may be modulated in accordance to procedures known in the art. For example, if the requested file is an analog file, then the encoder/modulator 44 may use frequency modulation (FM). If the requested file is a digital file, then the encoder/modulator 44 may use differential quadrature-amplitude modulation (QAM).

Information indicative of the requested file, the user, and so on, for each received request is provided to information control circuitry such as a processor 48 connected to interface 42. Processor 48 includes an output 50 which is connected to the control center 26 for providing such user request information to the control center 26. Circuitry 48 may also include an output 52 which is connected to the existing cable television service provider 24 and/or the existing telephone service provider 22, for providing billing information to these providers, which will be discussed in more detail below.

Referencing FIGS. 1 and 2, if the requested file is not located in the local library 20, then the request processor 40 sends import instructions to system control circuitry such as a processor 54 which has an output 56 connected to the control center 26. In response to the import instructions, the control center 26 searches the libraries 20 located in other regional networks 14 for the requested file. If the requested file is found, the control center 26 instructs the respective distribution center 18 to retrieve and transmit the requested file to the requesting user in accordance with the above description. In this regard, although there may be on the order of 100,000 data files located available to the users 12 in each regional network 14, through the use of the control center 26, users actually have available to them as many files as are located in all of the regional networks 14 combined.

Figure 3:
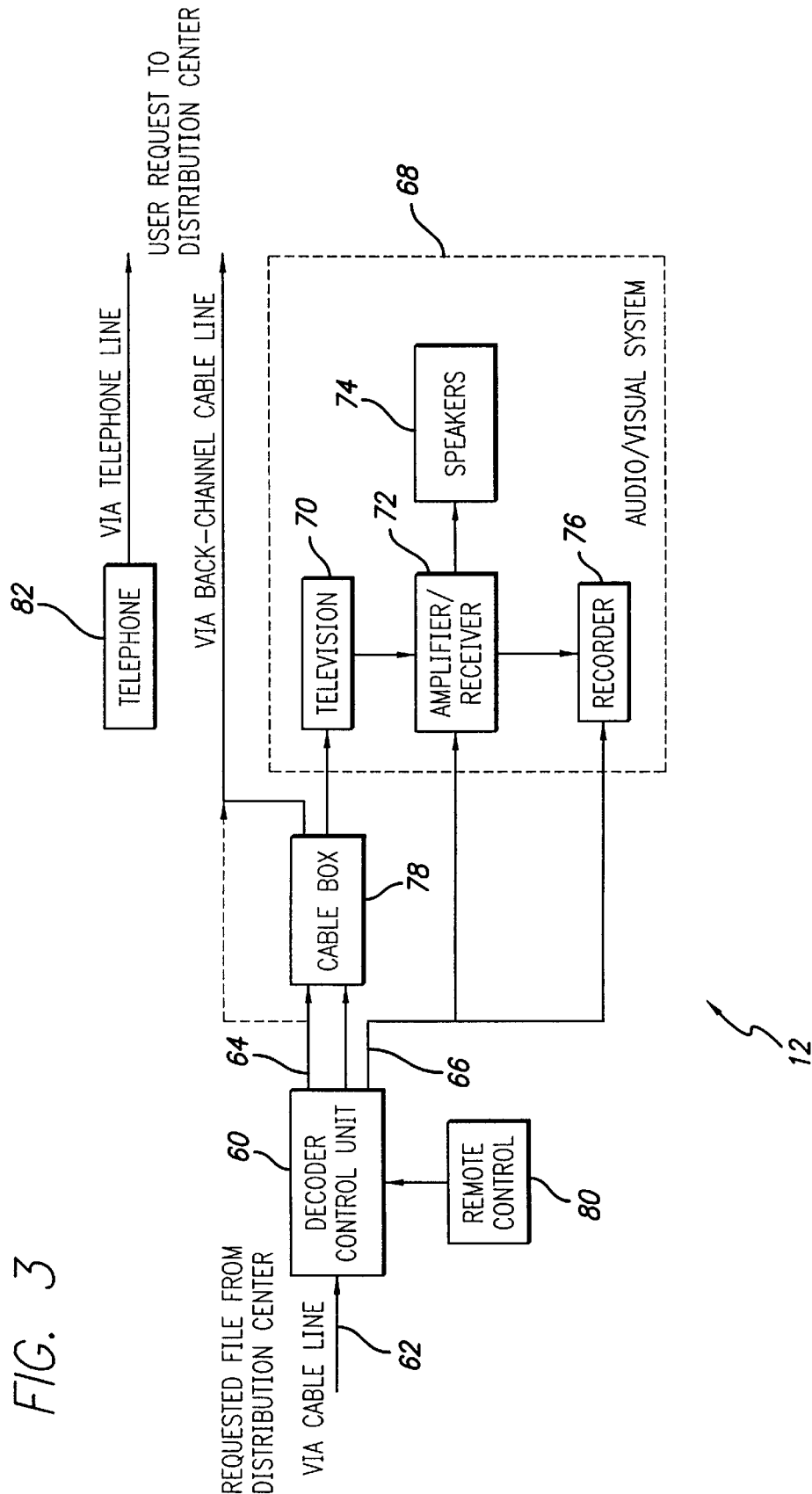
FIG. 3 is a schematic view of an exemplary embodiment of a user system of the distribution system of the present invention.

An exemplary embodiment of the user 12 in accordance with the present invention is illustrated in FIG. 3. Exemplary user 12 is shown schematically as a system including a decoder and control unit 60. Exemplary control unit 60 includes an input 62 and a request output 64 connected to the existing cable service 24 (via cable box 78), and further includes a file output 66 connected to an audio/visual system 68. The audio/visual system 68 may include a television 70, a receiver and/or amplifier 72 connected to speakers 74, and a recording device 76 such as a cassette tape recorder. In certain cable services 24, an existing cable box 78 may be connected between the control unit 60 and the television 70, although the cable box 78 is optional in the present invention. Exemplary user system 12 may also include a remote control 80 for use with the control unit 60 and a telephone 82 connected to the existing telephone service 22, which will be discussed in more detail below. Each of the components of the audio/visual system 68, as well as the telephone 82, may be existing equipment to which the control unit 60 is connectable.

To place a user request, the user activates the control unit 60 to display on the television 70 information related to data files available in any of the libraries 20 of the music distribution system 10. For example, in a music distribution system, the displayed information may include the name of the artist, the title, the producer, the record label, and so on. The user may browse the displayed information (e.g., by scrolling) and may then select one or more of the displayed data files (e.g., music tracks). Information relevant to the selected data files is included in a user request which is sent to the distribution center 18 from the request output 64 via the back-channel cable line. Additional information, such as the address of the user, is also included in each user request. If the back-channel cable line is not available, the user may place a user request on the telephone 82, entering information relevant to the selected data files on the numeric key pad. In a preferred embodiment of the distribution system 10, the existing cable service 24 allocates a dedicated channel which is used to control the equipment of the user systems 12 of each regional network 14. The dedicated channel may also carry information relevant to the titles available in the music distribution system 10.

As discussed above, the distribution center 18 sends the requested files to the user system 12. The decoder and control unit 60 receives and decodes the requested files, and then provides the decoded files to, for example, the stereo receiver 72 for an immediate audio playback on the speakers 74. Alternatively, the decoded files may be provided to the recorder 76 for recording for playback in the future. The decoded files may include both an audio and video signals, with the receiver 72 playing the audio portion and the television 70 playing the video portion (e.g., a music video). Because of the relatively high bandwidth of the existing cable system 24, the requested audio file may be played back in real time in full high-fidelity bandwidth.

The user requests generated by each of the user systems 12 may include information to customize the requests. For example, as discussed above, in a music-distribution implementation of the present invention, any number of selected music tracks in any desired playing order may be included in a user request. The request may indicate whether the play back should take place immediately or a predetermined time in the future. In addition, rather than requesting the music tracks to be played back at the user system 12 placing the request (e.g., User 2), the user request may include instructions for the distribution center 18 to send the requested files to another one of the user systems 12 (e.g., User 3) in any one of the other regional networks 14.

The advantages of the present invention are numerous. For example, existing cable and telephone systems may be utilized, as well as existing home entertainment centers. Consumers also have immediate access to a large library of files without having to leave their homes. This feature of the invention eliminates the need to travel to a retail outlet with a limited selection of music, or to wait for the arrival of a mail order of music. In addition, no warehouse is required for storing packaged music awaiting shipping, which also eliminate inventory control. Billing is essentially automatically accomplished as the distribution center 18 records all of the necessary information regarding each of the user requests.

As mentioned above, information relevant to each user request is recorded and processed by the information control processor 48 shown in FIG. 2. The recorded user-request information is indicative of each of the user's consumer behavior based on his or her musical tastes and may be used for marketing and promotional purposes accordingly. For example, advertising messages may be sent to the user systems 12 to be displayed on the television 70. In addition, the recorded information may contain data on the number of times each track is requested so that appropriate royalties may be paid to the artists. Furthermore, the recorded information may be used for billing purposes either directly or through the service provider, be it cable, satellite, telephone, optical fiber, or as appropriate.

Those skilled in the art will understand that the embodiments of the present invention described above exemplify the present invention and do not limit the scope of the invention to these specifically illustrated and described embodiments. The scope of the invention is determined by the terms of the appended claims and their legal equivalents, rather than by the described examples. In addition, the exemplary embodiments provide a foundation from which numerous alternatives and modifications may be made, which alternatives and modifications are also within the scope of the present invention as defined in the appended claims.

What is claimed is:

1. A system for distributing digital audio files in substantially real time to users connected to a plurality of satellite or cable TV networks, said system comprising:
   a) a plurality of private distribution centers, each including:
      1) a network interface including an input and an output for connecting to one of the satellite or cable TV networks;
      2) a library including a plurality of digital audio files;
      3) a library interface including an input and an output connected to said library; and
      4) a processor connected to said network interface and said library interface, said processor for:
         (a) displaying to a user a menu of said audio files;
         (b) receiving requests from a user for a plurality of said digital audio files and a user address;
         (c) retrieving said requested digital audio files from said library via said library interface;
         (d) sequentially transmitting said requested digital audio files in substantially real time to said user through one of the satellite or cable TV networks via said output of said network interface; and
         (e) recording the digital audio files requested by said user and said user address in a data base; and
   b) a central controller connected to said network interface of each of said distribution centers for routing digital audio data files between said distribution centers.

2. A system for distributing data files to users connected in a plurality of independent networks, said system comprising:
   a) a plurality of distribution centers, each including:
      1) a network interface including an input and an output for connecting to a single one of the networks;
      2) a library including a plurality of data files;
      3) a library interface including an input and an output connected to said library; and
      4) a processor connected to said network interface and said library interface, said processor for:
         (a) receiving a request from a user via said input of said network interface, said request including information on one or more data files and a user address;
         (b) determining which of said requested data files are available in said library ("available requested data files"), and which of said requested data files are unavailable in said library ("unavailable requested data files") and for each of said available requested data files, retrieving said available requested data file from said library via said library interface; and for each of said unavailable requested data files, sending a file import request to a central controller requesting said unavailable requested data files and receiving said unavailable requested data files through said network interface;
         (c) transmitting said requested data files to said single one of the networks via said output of said network interface; and
         (d) recording request information indicative of said requested data file and said user address; and
   b) a central controller directly connected to said network interface of each of said distribution centers for:
      1) receiving file import requests from a requesting distribution center, said file import requests including information relating to requested data files;
      2) searching the library within at least one other of said distribution centers to locate at least one requested data file of said requested data files; and
      3) instructing said other distribution center to retrieve and transmit the requested data file that was located therein to said requesting distribution center.

3. A system as claimed in claim 2, wherein said network interface is a cable television interface.

4. A system as claimed in claim 2, wherein said data files include digitized music tracks.

5. A system as claimed in claim 2, wherein each of said libraries includes a plurality of compact discs (CDs).

6. A system as claimed in claim 2 further comprising a plurality of control units each having a user address and including:
   a user input for connecting to one of the networks;
   a user output for connecting to an output device; and
   decoding circuitry connected to said user input and output for receiving said requested data file via said user input and providing said requested data file to the output device via said user output.

7. A system as claimed in claim 5 wherein each of said output devices includes an audio/visual system.

8. A system as claimed in claim 7 wherein each of said control units includes a remote control for activating said control unit to display information relevant to said data files of said library.

9. A system as claimed in claim 6 further comprising a storage device for recording the requested data file.

10. A system as claimed in claim 6 further comprising a telephone for sending a request from the user.

11. A system as claimed in claim 2 further comprising a modulator connected to said library and said processor for modulating said requested data file.

12. A method for distributing music, comprising the steps of:
   providing the system of claim 2
   generating at a user system a user request including information on a requested data file and a user address;
   receiving said user request at said network interface;
   processing said information of said user request;
   retrieving said requested data file from said library; and
   transmitting said requested data to file to said user system.

13. A method as claimed in claim 12 further comprising the step of:

recording request information indicative of said requested data file and said user address.

14. A method as claimed in claim 13 further comprising a step of using the recorded request information for marketing statistics and billing information.

15. A method as claimed in claim 12 wherein the user requesting transmittal of the requested data file to another user, and said transmitting step transmitting said requested data file to another user system.

16. A method as claimed in claim 12 wherein the user system having the control unit of claim 5, further comprising a step of recording the data file at a storage device of the control unit.

17. A system as claimed in claim 2 wherein said data files include digitized video files.

* * * * *